US006225607B1

(12) United States Patent
Has et al.

(10) Patent No.: US 6,225,607 B1
(45) Date of Patent: May 1, 2001

(54) SENSOR-CONTROLLED COOKTOP WITH A SENSOR UNIT ARRANGED BELOW THE COOKTOP PLATE

(75) Inventors: Uwe Has, Unterneukirchen-Oberschroffen; Katrin Horn, Traunreut; Maximilian Neuhauser, Chieming, all of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/455,601

(22) Filed: Dec. 6, 1999

(30) Foreign Application Priority Data

Dec. 4, 1998 (DE) ............................................ 198 56 140

(51) Int. Cl.[7] ................................ H05B 3/68; G01J 5/00

(52) U.S. Cl. .................................. 219/448.11; 219/446.1; 374/131

(58) Field of Search ............................ 219/446.1, 447.1, 219/448.11, 448.12, 502; 374/120, 121, 130, 131, 132

(56) References Cited

U.S. PATENT DOCUMENTS

| | | | |
|---|---|---|---|
| D. 384,239 | 9/1997 | Wilsdurt . | |
| 5,249,142 * | 9/1993 | Shirakawa et al. | 250/339.04 |
| 5,709,473 * | 1/1998 | Sultan et al. | 374/131 |
| 6,118,107 * | 9/2000 | Kobrich | 219/502 |
| 6,133,552 * | 10/2000 | Saulnier et al. | 219/446.1 |
| 6,140,617 * | 10/2000 | Berkcan et al. | 219/446.1 |

* cited by examiner

*Primary Examiner*—Sang Paik
(74) *Attorney, Agent, or Firm*—Herbert L. Lerner; Laurence A. Greenberg; Werner H. Stemer

(57) ABSTRACT

The sensor-controlled cooktop has a cooktop plate, in particular made of glass ceramic, with one or more defined cooking zones that can be heated with a heating element arranged below the cooktop plate. A heat radiation sensor unit is also arranged below the cooktop plate and is directed toward the underside of the latter in the region of a measuring spot of limited area. The sensor unit is connected to a control unit for regulating the heat output of the heating element. In order to achieve as accurate a regulation of the heat output as possible independently of the pot, there is provision, according to the invention, for the value of the transmittance of the material of the cooktop plate, at least in the region of the measuring spot, to be, at least in the spectral measuring range of the heat radiation sensor unit, lower than 30%, preferably lower than 10% and, in particular, approximately 0%.

13 Claims, 2 Drawing Sheets

SENSOR-CONTROLLED COOKTOP WITH A SENSOR UNIT ARRANGED BELOW THE COOKTOP PLATE

BACKGROUND OF INVENTION

FIELD OF THE INVENTION

The present invention relates to a sensor-controlled cooktop with a cooktop plate, in particular made of glass ceramic or glass, with at least one cooking zone that is heatable by means of a heating element arranged below the cooktop plate, and with a heat radiation sensor unit arranged below the cooktop plate and directed toward the underside of the latter in the region of a measuring spot of limited area and which is connected to a control unit for regulating the heat output of the heating element.

A cooktop of this type is known from published British patent application GB 2 072 334 A. There, a parabolic reflector arrangement is provided below the cooktop plate. The reflector arrangement collects the heat radiation radiated from the underside of the bottom of a pan put down on the cooktop plate and heated by means of the heating element and conducts this heat radiation via a connected optical connecting line to an infrared-sensitive photodiode. The heat radiation detected in this way is used as a signal for regulating the heat output of the heating element.

SUMMARY OF THE INVENTION

It is accordingly an object of the invention to provide a sensor-controlled cooktop, which overcomes the above-mentioned disadvantages of the heretofore-known devices and methods of this general type and which ensures that the heat output is regulated with sufficient accuracy independently of the pot.

With the foregoing and other objects in view there is provided, in accordance with the invention, a sensor-controlled cooktop, comprising:

a cooktop plate, particularly a glass-ceramic plate, having an underside and a top surface with at least one cooking zone;

a heating element for heating the cooking zone disposed below the cooktop plate;

a heat radiation sensor unit disposed below the cooktop plate and directed towards a measuring spot of limited area defined on the underside of the cooktop plate, the heat radiation sensor unit having a defined spectral measuring range;

a control unit connected to the radiation sensor for regulating a heat output of the heating element; and the cooktop plate, in a region of the measuring spot, having a transmittance in the spectral measuring range of the heat radiation sensor unit of less than 30%, or less than 10%, or, preferably, 0%.

In other words, the objects of the invention are satisfied in that the value of the transmittance of the cooktop plate, at least in the region of the measuring spot, amounts, at least in the spectral measuring range of the heat radiation sensor unit, to a substantially reduced amount. Selecting a low value for the transmittance of the material of the cooktop plate ensures that the unknown and therefore disturbing influence of the heat radiation radiated from the pot bottom in the direction of the cooktop plate and therefore onto the heat radiation sensor is minimal. This is important particularly because the value of the emittance of the underside of the pot bottom may shift typically between 20 and 90%, depending on the type of cooking pot. The invention therefore ensures that the heat radiation sensor receives essentially to exclusively the heat radiation radiated from the underside of the cooktop plate.

In accordance with an added feature of the invention, an emittance of the cooktop plate, at least in the region of the measuring spot and at least within the spectral measuring range of the heat radiation sensor unit, amounts to at least 60% and, in a preferred embodiment, to at least 90%.

This helps achieve sufficient measuring sensitivity of the sensor-controlled cooktop. The measuring accuracy according to the invention is at least sufficient to make it possible to carry out roasting or frying operations with satisfactory cooking results. In order to increase the accuracy of the sensor-controlled system, it is expedient to use pots or pans which have a bottom which is as flat as possible and therefore rests over a large area on the top side of the cooktop plate.

In accordance with an additional feature of the invention, a dark emission layer is formed on the underside of the cooktop plate in the region of the measuring spot. A measuring spot having suitable transmission and emission properties can be implemented at low outlay by providing the cooktop plate with the dark emission layer. The layer is preferably black. The transmission and emission values are then, on the one hand, independent of manufacturing spreads and, on the other hand, essentially constant over the lifetime of the cooktop plate in spite of the aging of the latter. Furthermore, the values are then also independent of the properties of the material of the cooktop plate or independent of the manufacturer or color shade.

In accordance with another feature of the invention, the measuring spot has a surface extent of about 1 to 4 $cm^2$. This is a particularly suitable size of the measuring spot. It ensures, on the one hand, that the measuring spot is not too large, which would be detrimental to achieving a uniform cooking result in the pan or pot. On the other hand, the measuring spot also should not be too small, so that the influence of the heat radiation of the pot bottom on the glass ceramic remains sufficiently high. If the surface extent of the measuring spot is too small, its sensed temperature, despite the low thermal conductivity of, for example, glass or glass ceramic, essentially depends solely on the temperature of the glass ceramic in the vicinity of the measuring spot. The purpose of the cooktop according to the invention, however, is to deduce the temperature of the cooking vessel put down on the cooktop plate and heated or to regulate this temperature.

In accordance with a further feature of the invention, the heat radiation sensor unit includes a spectral filter having a spectral passband of approximately 4 to 8 $\mu$m. In this range, both the value of the transmittance and that of the average reflectance of the material of the cooktop plate in the case of typical glass-ceramic cooktop plates are sufficiently low. The result of this, in this wavelength range, is a high emittance of the underside of the cooktop plate and consequently high measuring sensitivity and accuracy. Alternatively, the spectral passband may typically also be between 10 and 20 $\mu$m. In this range, too, the value of the transmittance in the case of typical glass-ceramic material is about 0% and that of the reflectance is markedly lower than in the wavelength ranges adjacent on both sides. The choice of a suitable spectral filter depends, in particular, on its price and on the sensitivity or measuring and regulating accuracy of the sensor-controlled cooktop which can be achieved in the respective wavelength range.

In accordance with again an added feature of the invention, a measuring well is disposed at the underside of the cooktop plate in the region of the measuring spot. The heat radiation sensor unit is directed onto the measuring spot of the cooktop plate. This measure ensures that the influence exerted on the temperature of the measuring spot by the heating element radiating the heat radiation is greatly reduced or is ruled out. In this case, it is particularly favorable if the measuring well bears as closely as possible against the underside of the cooktop plate, and if the radiation channel in the measuring well is insulated as effectively as possible from the space outside the measuring well.

In accordance with a corresponding feature of the invention, the heating element surrounds the measuring well and the measuring spot substantially on all sides. This feature helps achieve as uniform a distribution of heat as possible in the pot bottom and in the cooktop plate and consequently high measuring accuracy.

In accordance with a concomitant feature of the invention, a computing unit receives a signal of the heat radiation sensor unit. The computing unit then computes, from the signal and from characteristic data of the cooktop stored in s memory unit, a temperature of a bottom of a heated pot placed on the cooktop plate and transmits the computed temperature to the control unit.

Typical characteristic numbers for relating the measurement signal of the sensor unit to the prevailing pot bottom temperature can be obtained from findings acquired in laboratory tests. These characteristic numbers are then stored in the memory unit and are suitably interlinked with the measurement signal of the heat radiation sensor unit during the cooking operation. From the bottom temperature derived from this, actuating signals are then determined, in turn, for the heat output of the corresponding heating element. Particularly in the case of large-area cooking vessels, such as, for example, roasting trays, the accuracy of the system can be increased if at least two heat radiation sensor units are used. It is expedient, furthermore, to provide a pot recognition unit known per se or to use the measurement signals of the heat radiation sensor unit for pot recognition.

Other features which are considered as characteristic for the invention are set forth in the appended claims.

Although the invention is illustrated and described herein as embodied in a sensor-controlled cooktop with a sensor unit arranged below the cooktop plate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
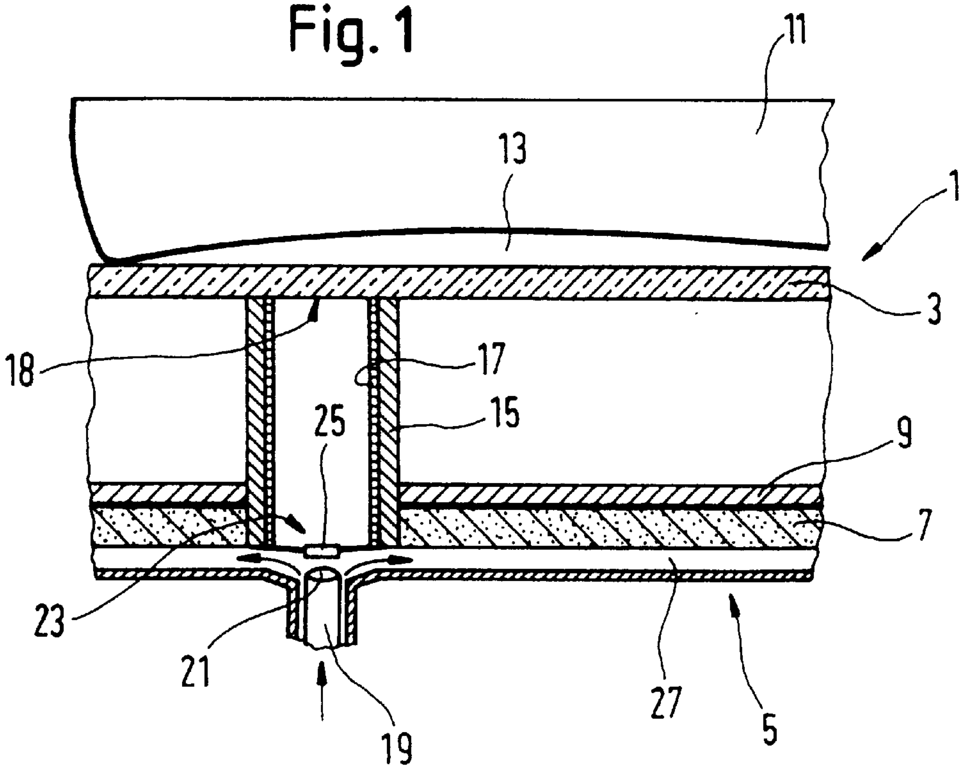
FIG. 1 is a partial sectional view of a cooktop with a cooking pot placed on it, according to the first exemplary embodiment of the invention.

Referring now to the figures of the drawing in detail and first, particularly, to FIG. 1 thereof, there is seen a cooking hob or cooktop 1 with a cooktop plate 3 made of glass-ceramic material. On a top side of the plate there are marked heatable zones with the aid of a decorative print. Such a marked cooktop plate and a corresponding marking design are disclosed, for instance, in the commonly assigned U.S. Pat. No. Des. 384,239, which is herewith incorporated by reference. These zones are in each case assigned, below the cooktop plate 3, corresponding metallic heating body pots 5. The heating body pots 5 are well known in the art and will, therefore, not described in detail. The pots 5 are pressed onto the underside of the cooktop plate 3 by means of corresponding assemblies. The heating body pot 5 is provided, at the bottom and circumferentially, with a heating body insulation 7. Held in this or on this is a conventional radiant heating conductor 9 which, when it is supplied with electrical current, emits heat radiation, in particular in the direction of the underside of the cooktop plate 3.

A roasting pan 11, or the like, is put down on the top side of the cooktop plate 3 above the heating body pot 5 or the radiant heating conductor 9. There is typically a small air gap 13 between the underside of the bottom of the roasting pan 11 and the top side of the cooktop plate 3. An emittance $\epsilon$ of the underside of the pot bottom 11 amounts, in the case of high-grade steel pots, typically to approximately 10 to 20% and, in the case of a black-enameled pot bottom, typically to approximately 80 to 90%.

A tubular measuring well 15 is provided in the region below the bottom of the roasting pan 11. The measuring well 15 has an upper end face that bears closely against the underside of the cooktop plate 3. The diameter of the measuring well is about 1 to 2 cm. The measuring well 15 is provided with suitable insulating means for thermally partitioning off the measuring arrangement described below, in particular in relation to the heating conductor 9. Furthermore, the measuring well 15 has a reflecting layer 17 on its inner circumferential side in order to increase the sensitivity of the measuring arrangement described below. The circular surface, delimited by the measuring well 15, on the underside of the cooktop plate 3 serves as a measuring spot 18 for the measuring arrangement. An infrared sensor 19 sensitive to heat radiation is arranged at that end of the measuring well 15 which is located opposite the measuring spot 18. The infrared sensor 19 is preceded, in a perceived signal flow direction from the heat pickup towards the sensor, by infrared optics 21 having a spectral filter, the spectral passband of which is between 5 and 8 $\mu$m. The infrared sensor 19 is directed onto the measuring spot 18 of the cooktop plate 3 through a diaphragm aperture 23 in the bottom of the measuring well 15. A suitable sensor window 25 is set into the diaphragm aperture 23 in order to protect the infrared sensor 19. In order to cool the infrared sensor 19, the latter is seated in a cooling duct connection piece of the bottom of the heating body pot 5, to which cooling air (cooling air arrows) is supplied as required. Furthermore, a cooling duct 27 is provided between the heating body pot 5 and the heating body insulation 7. This ensures that the permissible continuous operating temperature of the infrared sensor 19 of about 100 to 120° C. is not exceeded.

Figure 2:
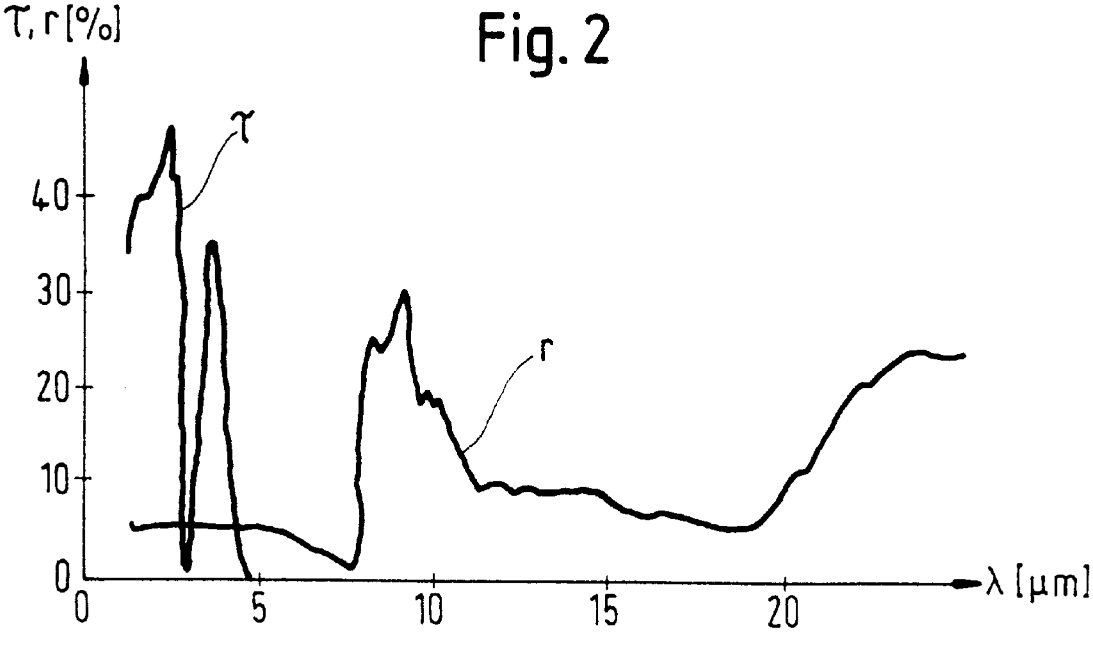
FIG. 2 is a graph of the profiles of the transmittance and reflectance of a glass-ceramic cooktop plate in the relevant wavelength range.

The glass-ceramic cooktop plate has a transmittance $\tau$ of about 0% in the spectral measuring range of the infrared sensor 19 of about 5 to 8 $\mu$m according to FIG. 2. The measuring range is defined by the spectral filter. This means that the heat radiation radiated from the pot bottom 11 cannot pass directly through the cooktop plate 3 to the infrared sensor 19. The pot bottom 11 can heat only the glass-ceramic plate 3 by heat conduction and heat radiation. The plate, then, radiates radiant heat to the infrared sensor 19 at an average emittance $\epsilon$ (=1−r) of about 95% (see FIG. 2). The measuring and regulating accuracy of the system is higher, the more efficient the thermal coupling of the pot bottom 11 to the glass-ceramic plate 3, on the one hand, and the coupling of the latter to the infrared sensor 19, on the other hand. Alternatively, it is also possible to provide a spectral filter 21, the spectral passband of which is between about 10 and 20 $\mu$m. In the wavelength range of $\lambda$=10 to 20 $\mu$m, too, the value of the transmittance $\tau$ is about 0% and that of the reflectance r is around 10%, thus resulting in average emittance $\epsilon$ of about 90% (FIG. 2).

Figure 5:
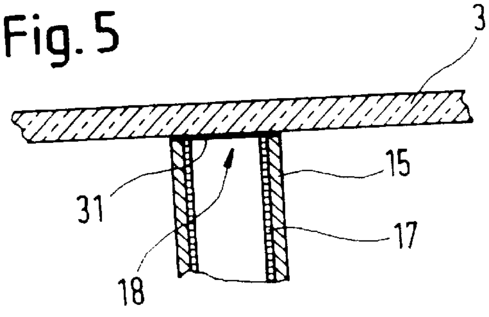
FIG. 5 is a partial sectional view showing the region below the cooktop plate in the region of the measuring spot, according to a second exemplary embodiment.

In order to be fundamentally independent of the material properties of the cooktop plate—according to the second exemplary embodiment shown in FIG. 5—the underside of the cooktop plate 3 is covered with a black color layer 31 in the region of the measuring spot 18. In this case, the value of the transmittance $\tau$ is ideally about 0% and that of the emittance $\epsilon$ is about 100%.

Figure 3:
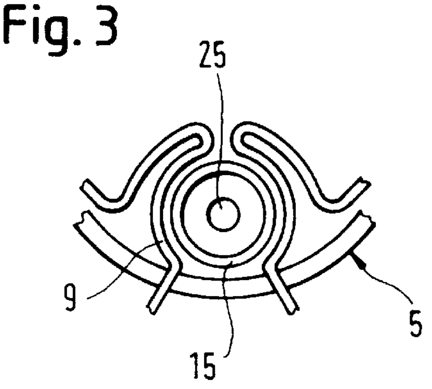
FIG. 3 is a partial top view of the arrangement of the heating element in the region of the measuring well of the heat radiation sensor unit.

In order to achieve as uniform a distribution of heat as possible in the pot bottom 11 and in the glass-ceramic plate 3, according to FIG. 3 the heating conductor 9 surrounds the measuring well 15 essentially on all sides. Whether the measuring well 15 is in this case arranged at the edge of the heating body pot 5 or, instead, in the central region of the latter depends on the respective circumstances. For example, if two measuring wells 15 are used in a heating body pot 5 for reasons of accuracy, it may be advantageous, for example, in spite of a nonuniform temperature distribution in the bottom of the pan, if the two measuring wells 15 are arranged in each case in the edge region of the heating body pot 5 (FIG. 3).

Figure 4:
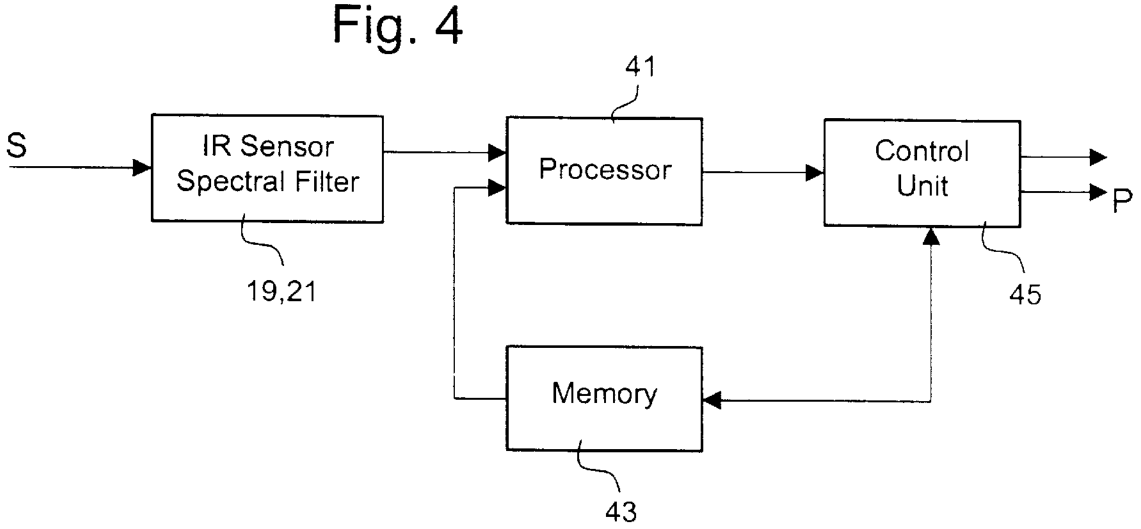
FIG. 4 is a block diagram with the essential regulating units of the sensor-controlled cooktop according to the invention.

When the sensor-controlled cooktop 1 is in operation, the underside of the pot bottom 11 heated by the radiant heating conductor 9 radiates heat radiation continually onto the cooktop plate 3 arranged below it. On the other hand, both the radiant heating conductor 9 and the cooktop plate 3 radiate heat radiation to the pot bottom 11. In addition, in the regions in which the pot bottom touches the cooktop plate, there is heat conduction between both of these. The same also applies within the cooktop plate 3 in the direction parallel to the latter. The infrared sensor 19 is shielded from the heat radiation of the radiant heating conductor 9 by the measuring well 15. Moreover, the infrared sensor is also largely shielded from the heat radiation of the cooking vessel 11 due to the properties of the material of the cooktop plate. In a series of measurements, then, a relationship can be determined between the heat radiation radiated from the underside of the glass-ceramic cooktop plate 3 in the region of the measuring spot 18 to the infrared sensor 19 and the temperature of the bottom of the roasting pan 11. When the cooktop 1 is in operation, from the measured value S of the infrared sensor 19 and from characteristic data of the arrangement which are stored in a memory unit 43 of the cooktop 1 a processor or computing unit 41 of the cooktop determines a corresponding output signal, from which a control unit 45 of the cooktop 1 derives a heat output signal P for the radiant heating conductor 9 (FIG. 4).

It is thereby possible, for example, for a frying temperature of 180° C. predetermined by an operator via conventional input elements to be regulated automatically by means of the control unit 45.

We claim:

1. A sensor-controlled cooktop, comprising:

a cooktop plate having an underside and a top surface with at least one cooking zone;

a heating element for heating said cooking zone disposed below said cooktop plate;

a heat radiation sensor unit disposed below said cooktop plate and directed towards a measuring spot of limited area defined on the underside of said cooktop plate, said heat radiation sensor unit having a defined spectral measuring range;

a control unit connected to said radiation sensor for regulating a heat output of said heating element; and said cooktop plate, in a region of the measuring spot, having a transmittance in the spectral measuring range of said heat radiation sensor unit of less than 30%.

2. The sensor-controlled cooktop according to claim 1, wherein the transmittance of said cooktop plate in the region of the measuring spot is less than 10%.

3. The sensor-controlled cooktop according to claim 1, wherein the transmittance of said cooktop plate in the region of the measuring spot is approximately 0%.

4. The sensor-controlled cooktop according to claim 1, wherein said cooktop plate is made of glass ceramic.

5. The sensor-controlled cooktop according to claim 1, wherein an emittance of said cooktop plate, at least in the region of the measuring spot, in the spectral measuring range of the heat radiation sensor unit, amounts to at least 60%.

6. The sensor-controlled cooktop according to claim 1, wherein an emittance of said cooktop plate, at least in the region of the measuring spot, in the spectral measuring range of the heat radiation sensor unit, amounts to at least 90%.

7. The sensor-controlled cooktop according to claim 1, which further comprises a dark emission layer formed on said underside of said cooktop plate in the region of the measuring spot.

8. The sensor-controlled cooktop according to claim 1, wherein said measuring spot has a surface extent of about 1 to 4 $cm^2$.

9. The sensor-controlled cooktop according to claim 4, wherein said heat radiation sensor unit includes a spectral filter having a spectral passband of approximately 4 to 8 $\mu$m.

10. The sensor-controlled cooktop according to claim 4, wherein said heat radiation sensor unit includes a spectral filter having a spectral passband of approximately 10 to 20 $\mu$m.

11. The sensor-controlled cooktop according to claim 1, which comprises a measuring well disposed at said underside of said cooktop plate in the region of the measuring spot, wherein said heat radiation sensor unit is directed onto said measuring spot of said cooktop plate.

12. The sensor-controlled cooktop according to claim 11, wherein said heating element surrounds said measuring well and said measuring spot substantially on all sides.

13. The sensor-controlled cooktop according to claim 1, which further comprises a computing unit and a memory unit connected to said computing unit, said computing unit receiving a signal of said heat radiation sensor unit and computing, from the signal and from characteristic data of the cooktop stored in said memory unit, a temperature of a bottom of a heated pot placed on said cooktop plate and transmitting the computed temperature to said control unit.

* * * * *